(12) United States Patent
Scott

(10) Patent No.: US 7,141,746 B1
(45) Date of Patent: Nov. 28, 2006

(54) DEVICE FOR DETERMINING ON BOARD WEIGHT OF TRACTOR-TRAILERS AND METHOD

(76) Inventor: Dale W. Scott, P.O. Box 686, Mechanicsburg, PA (US) 17055

( * ) Notice: Subject to any disclaimer, the term of this patent is extended or adjusted under 35 U.S.C. 154(b) by 0 days.

(21) Appl. No.: 11/216,766

(22) Filed: Aug. 31, 2005

Related U.S. Application Data

(60) Provisional application No. 60/700,363, filed on Jul. 18, 2005.

(51) Int. Cl.
*G01G 19/08* (2006.01)
(52) U.S. Cl. .................................................. 177/137
(58) Field of Classification Search ........ 177/136–139, 177/146; 116/DIG. 32
See application file for complete search history.

(56) References Cited

U.S. PATENT DOCUMENTS

| | | |
|---|---|---|
| 336,457 A | 2/1886 | Warren |
| 388,874 A | 9/1888 | Howard |
| 1,225,094 A | 5/1917 | Wollensak |
| 1,294,298 A * | 2/1919 | Moulton ................. 177/137 |
| 1,407,078 A | 2/1922 | Murray |
| 1,432,631 A * | 10/1922 | Sonnlechner et al. ....... 177/138 |
| 1,584,489 A * | 5/1926 | Swartley ................. 177/137 |
| 1,640,930 A | 8/1927 | Gartner |
| 1,689,978 A | 10/1928 | Swartley |
| 1,787,884 A | 1/1931 | Walsh |
| 2,106,652 A | 1/1938 | Pinson ................. 265/40 |
| 2,687,293 A | 8/1954 | Jackson ................. 265/40 |
| 2,717,775 A | 9/1955 | Jackson ................. 265/42 |
| 2,796,251 A | 6/1957 | Donaldson ............. 265/42 |
| 3,092,818 A | 6/1963 | Potschka .............. 340/198 |
| 3,109,505 A | 11/1963 | Davis et al. .......... 177/137 |
| 3,151,692 A * | 10/1964 | Dysart ................. 177/138 |
| 3,167,142 A * | 1/1965 | Meneely ............... 177/137 |
| 3,420,325 A * | 1/1969 | McAlister et al. ....... 177/137 |
| 3,428,139 A * | 2/1969 | Nolan ................. 177/137 |
| 3,480,095 A | 11/1969 | Tuchman .............. 177/137 |
| 3,563,326 A | 2/1971 | Guerriero ............. 177/138 |
| 3,771,614 A | 11/1973 | Kerr ................. 177/137 |
| 4,375,839 A | 3/1983 | Manning et al. ........ 177/137 |
| 4,384,628 A | 5/1983 | Jackson ............... 177/137 |
| 4,706,768 A * | 11/1987 | Kozozian et al. ........ 177/138 |
| 4,756,374 A | 7/1988 | Bailey et al. ........... 177/137 |
| 4,832,141 A | 5/1989 | Perini et al. ............ 177/141 |
| 4,917,197 A | 4/1990 | Waite, Jr. ............. 177/137 |
| 5,478,974 A | 12/1995 | O'Dea ................. 177/25.14 |
| 6,378,276 B1 * | 4/2002 | Dorge et al. ........... 53/502 |

FOREIGN PATENT DOCUMENTS

GB 2 038 005 A 11/1979

* cited by examiner

*Primary Examiner*—Randy W. Gibson
(74) *Attorney, Agent, or Firm*—Hooker & Habib, P.C

(57) ABSTRACT

A device and method for determining the weight carried at the axles of a tractor-trailer. The invention measures the distance that the tractor-trailer's suspension system is compressed by a load at each axle to determine the weight of the load at a tractor-trailer axle.

18 Claims, 2 Drawing Sheets

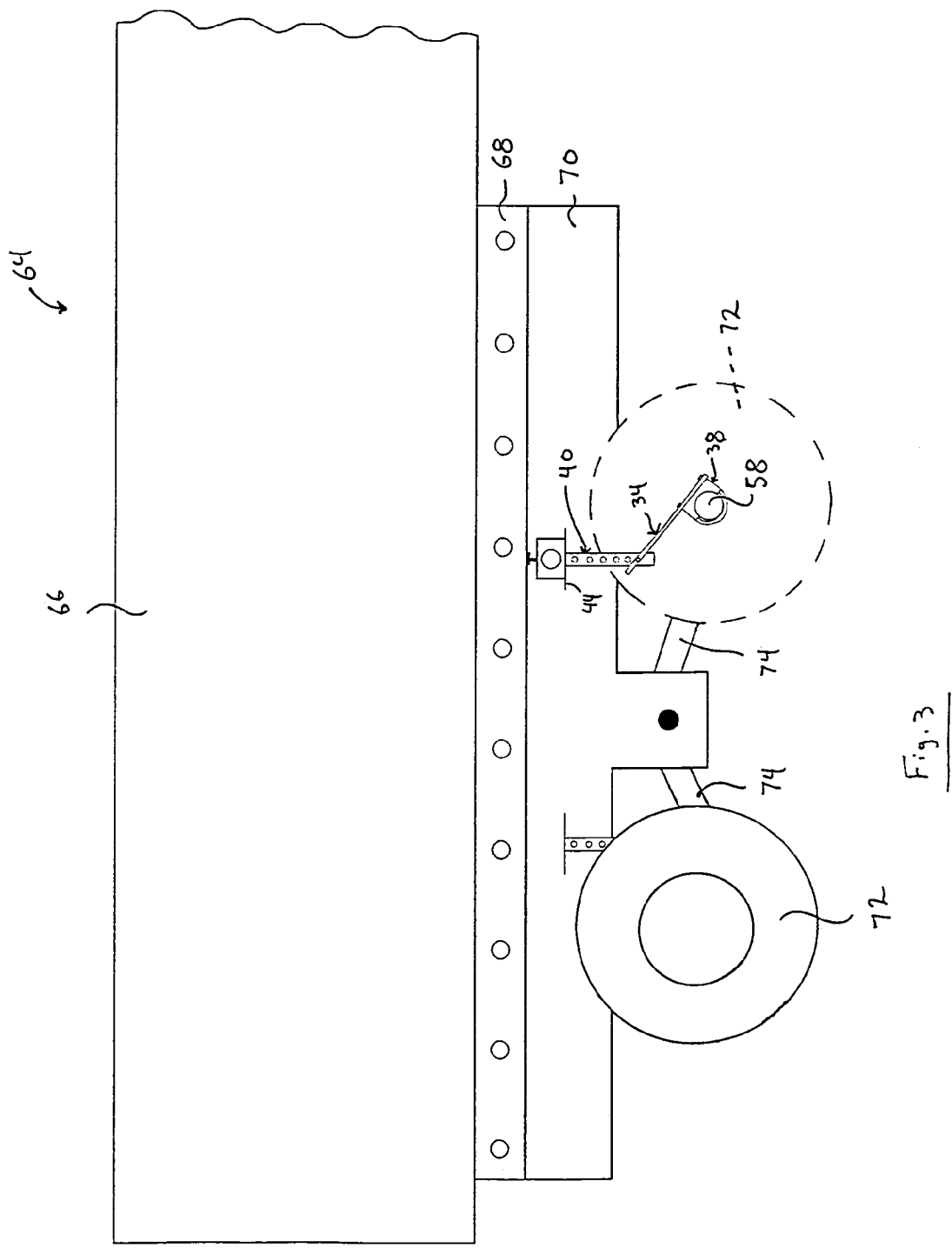

Page 1

DEVICE FOR DETERMINING ON BOARD WEIGHT OF TRACTOR-TRAILERS AND METHOD

This application claims the benefit of U.S. Provisional Patent Application No. 60/700,363 filed Jul. 18, 2005.

FIELD OF THE INVENTION

The invention relates to a device and method for determining the weight carried by the axles of a spring ride tractor-trailer.

BACKGROUND OF THE INVENTION

Operators of tractor-trailer trucks must monitor the weight carried at each axle of a tractor-trailer in order to comply with highway laws. A load must be distributed in the trailer so that the weight carried by each axle is within a legal limit. It is difficult to determine the weight supported by each axle of a tandem axle tractor-trailer.

Conventionally, weight carried by each axle of a tractor-trailer is determined by using a drive-up truck weigh station. Drive-up weigh stations measure the weight carried by a tractor-trailer axle at the tires. The tires of each axle are positioned on top of a scale to find the amount of weight carried by the axle.

Drive-up truck weigh stations are expensive. These stations are operated by truck stops or a governmental entity and are often located at remote sites. The loaded trailer must be driven to the weigh station for weight determination, consuming fuel and time. Further, considerable time is often spent waiting for the scale to be available if other trailers are being weighed as well. Fees are charged to use the weigh station.

Onboard scales for measuring the weight carried at each axle of air ride tractor-trailers are known. Load cells are installed between the axles and the air ride suspension. These systems are expensive to purchase, install and maintain and are complicated to use.

Thus, there is a need for an on board weight system for tractor-trailers and method for determining the weight at each axle of a loaded tractor-trailer without the necessity of traveling to a weight station. The system should be inexpensive, reliable, and easy to use.

SUMMARY OF THE INVENTION

The invention is an on board weight system for determining the weight at each axle of a loaded tractor-trailer and method.

Spring ride tractor-trailers include a cargo compartment supported by a rail frame. Each tractor-trailer axle is connected to the rail frame by a suspension system that includes a spring on each side of the tractor-trailer. The weight of a load in the compartment compresses the springs decreasing the distance between each axle and the rail frame. A spring connected to one side of a tractor-trailer axle may be compressed more than a spring connected to the same axle on the other side of the tractor-trailer depending on the distribution of the load in the compartment.

The present invention includes a distance indicator that precisely measures the distance between each end of each axle and the rail frame. These distances are used to calculate the weight of the load carried by each axle. The invention may be used with tractor-trailers having any number of axles supported by leaf springs having a linear spring rate or air springs having a non-linear spring rate.

The distance indicator is placed on support members that are permanently secured to each side of each axle on the tractor-trailer. Each support member includes a support plate for holding the distance indicator proximate the frame rail.

Each support member is mounted on one side of an axle so that the support plate is positioned parallel and below the frame rail. Mounting of the support members is done while the tractor-trailer is parked on a flat surface and the cargo compartment is empty to assure proper orientation. In order to determine a load in the tractor-trailer, the tractor-trailer must be parked on a flat surface. If a flat surface cannot be located, hydraulic jacks may be used to raise one or more axles to simulate a flat surface.

The system must be calibrated using an unloaded trailer. First, the unloaded weight at each axle is found by conventional means. Then, the distance indicator is used to measure the distance between the frame and the support member on each side of each axle of the unloaded trailer.

Next, a load is placed in the tractor-trailer and the loaded gross weight at each axle is found by conventional means, such as a weigh station. Finally, the distance indicator is used to measure the distance between the frame and the support member on each side of each axle for the loaded trailer. These measurements are used to determine a calibration value for each tractor-trailer axle.

When cargo of unknown weight is loaded into the tractor-trailer, the distance indicator is again used to measure the distances between the frame and the support member on each side of each axle. A calculation is performed using the calibration value for an axle to determine the weight carried by that each.

The system is easy to use, inexpensive, requires little maintenance and determines the weight carried by axles of spring ride tractor-trailers without using a weigh station.

Other objects and features of the present invention will become apparent as the description proceeds, especially when taken in conjunction with the accompanying drawing sheets illustrating the invention.

BRIEF DESCRIPTION OF THE DRAWINGS

FIG. 3 is a side view of a spring ride tractor-trailer installed with the present invention.

DESCRIPTION OF THE PREFERRED EMBODIMENT

Figure 1:
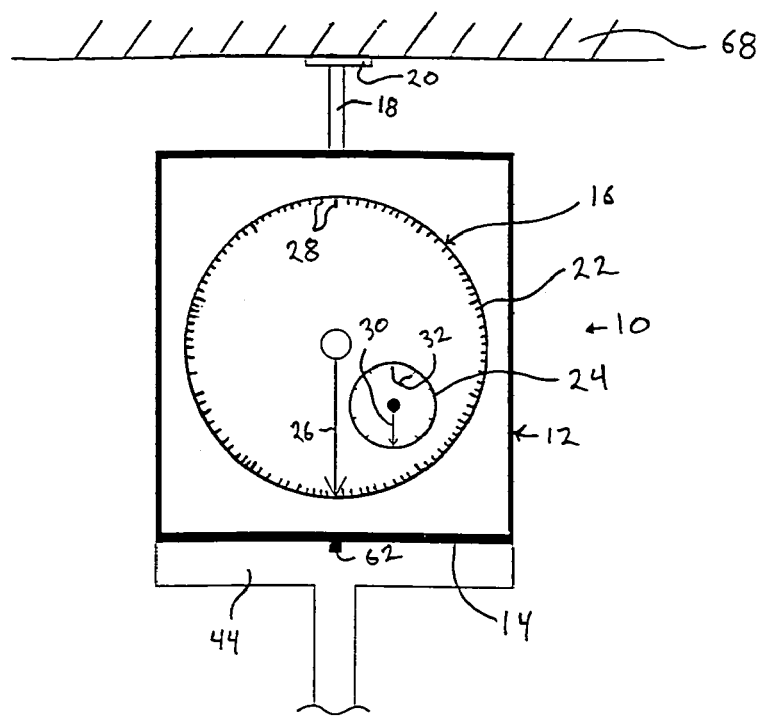
FIG. 1 is a front view of a distance indicator on a support plate in accordance with the present invention.
Figure 2:
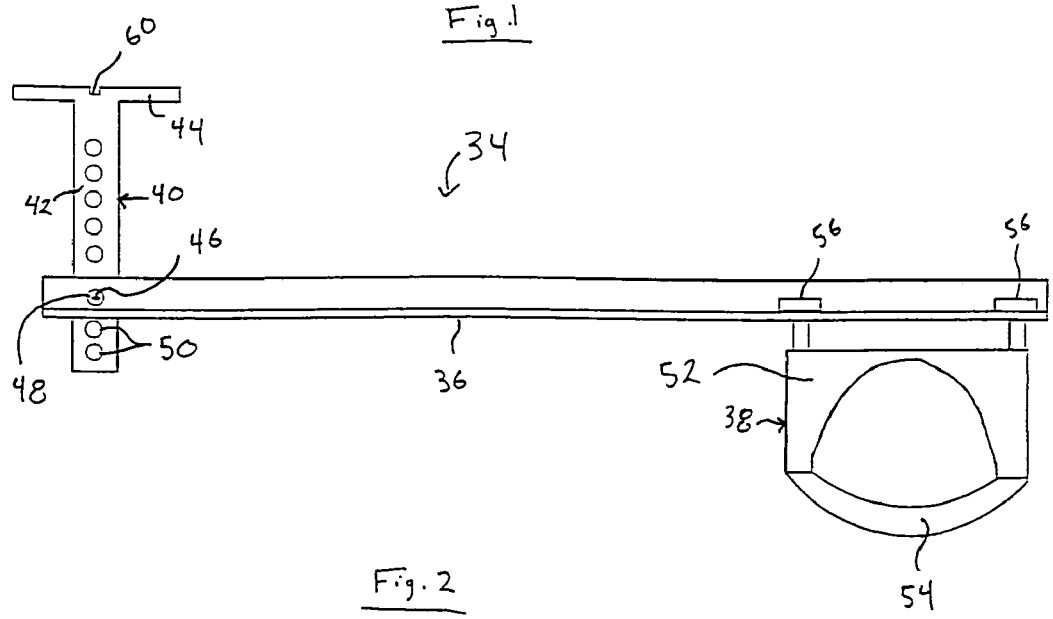
FIG. 2 is a perspective view of a support member in accordance with the present invention.

Distance indicator 10 precisely measures distances. Distance indicator 10 includes a body 12 having a base 14 and a gauge 16. Probe 18 extends upwardly from body 12 and includes an upwardly facing engagement surface 20. When a force is exerted on engagement surface 20, probe 18 moves down from a rest position. The distance probe 18 moves down is indicated by the rotary positions of indicator arms or needles 26 and 30.

Gauge 16 has a major dial 22 and minor dial 24. The downward motion of probe 18 causes major arm 26 to rotate clockwise around major dial 22. Major dial 22 is divided into one hundred sections by marks 28. Motion of major arm 26 from one mark 28 to an adjacent mark 28 indicates that probe 18 has moved a distance of one thousandth of one inch.

Every full rotation of 360 degrees around major dial 22 by major arm 26 is recorded by minor arm 30 moving clockwise around minor dial 24 from one mark 32 to an adjacent mark 32. Minor dial 24 is divided into 10 sections by marks 32. Motion of minor arm 30 from one mark 32 to an adjacent mark 32 indicates that probe 18 has moved a distance of one tenth of one inch.

Distance indicator 10 may be manually calibrated to permit a user to adjust the position of probe 18 to a desired rest position and adjust gauge 16 to a reading of zero inches when probe 18 is at the rest position.

Distance indicator 10 may be a Cen-tech brand 1" travel machinist's dial indicator, item number 623-0VGA.

If desired, indicator 10 may include a digital measuring device and/or an electronic display that indicates the position of probe 18.

Distance indicator 10 is placed on each support member 34 to determine the change in distance between the axle and a rail on the trailer. Each support member 34 has an elongate L-beam support or arm 36 with an axle clamp member 38 on one end and a mounting member 40 on the other end.

Mounting member 40 has a short mounting arm 42 and a support plate 44. Mounting member 40 may be adjustably secured to L-beam support arm 36 by a conventional nut and bolt fastener 46 extended though aligned L-beam aperture 48 and a mounting member aperture 50. If desired, mounting member 40 may be slidably mounted to arm 36 through use of an adjustable clamp (not shown).

Axle clamp member 38 has a clamp base 52 and clamp ring 54. Bolts 56 extend through holes in support arm 36 to attach clamp member 38 to the end of L-beam support arm 36 away from mounting member 40. Bolts 56 are tightened into clamp base 52 to secure clamp member 38 to an outer end of tractor-trailer axle 58. The support members are mounted on the end of each axle with plates 44 below a trailer frame rail 68.

Distance indicator 10 is placed on support plate 44. If desired, support plate 44 may include a notch 60 that fits around a flange 62 on base 14 to assure distance indicator 10 is properly seated on plate 44. If necessary, arm 36 may be bent to facilitate user access to support plate 44 when support member 34 is mounted to a tractor-trailer axle 58.

FIG. 3 shows a two-axle spring ride tractor-trailer 64 having a cargo compartment 66. Spaced frame rails 68 support compartment 66. Each frame rail 68 is supported by suspension 70 joined to axles 58. Tires 72 are mounted on each end of axles 58. Suspension 70 includes leaf springs 74. Leaf springs 74 are attached to each end of each axle 58 inwardly from tires 72.

As a load is placed in compartment 66, the leaf springs 74 are compressed a distance depending on the placement of the load in compartment 66 and the weight of the load.

Clamp 38 attaches support member 34 to axle 58. A support member 34 is placed inside of each tire 72 on each axle 58 and positioned so that each mounting member 40 is proximate and below the adjacent frame rail 68 and support plate 44 is parallel to frame rail 68 when tractor-trailer 64 is parked on a flat surface and compartment 66 is empty. Fasteners 46 are then tightened to hold the members 40 in place.

The method of finding the weight at each axle of a loaded spring ride tractor-trailer 64 will now be described.

First, a calibration value for each axle 58 of tractor-trailer 64 is found.

To find the calibration value for each axle 58 of tractor-trailer 64, support members 34 are mounted on each side of each axle 58. Unloaded tractor-trailer 64 is parked on a flat surface and the support plate 44 on each end of each axle 58 is positioned under adjacent frame rail 68. If a flat surface is not available, hydraulic jacks may be used to raise axles 58 in order to simulate parking tractor-trailer 64 on a flat surface.

Next, the weight of the unloaded tractor-trailer 64 at each axle 58 is determined by a truck scale or other conventional means. Distance indicator 10 is placed on each support plate 44 and is calibrated to assure probe 18 engages the overlying frame and is in a rest position or a known position for each plate 44 when tractor-trailer 64 is unloaded. If necessary, the position of support plate 44 relative to frame rail 68 is adjusted or the calibration of gauge 16 is adjusted. The distance between the plates and the rails of the unloaded trailer is recorded.

Next, a known load is placed in the tractor-trailer compartment 66. The load may be placed of the axle or axles or may be placed in another location in the trailer so long as it is partially supported by the axle or axles. Preferably, this load is in the range of 40,000 to 45,000 pounds.

Next, the loaded weight at each axle 58 is found using a truck scale or other conventional means. The difference between the loaded weight at each axle and the unloaded weight at each axle is calculated to find the amount of the load carried by each axle 58.

Next, distance indicator 10 is placed on each support plate 44 and is used to take measurements at each end of each axle 58 for the loaded trailer. The measurements are read from gauge 16 and recorded.

Next, the average of the measurements taken at each end of each axle 58 is found. The measurements are summed together and the sum of the measurements is divided by the total number of measurements taken. For one axle, two measurements are taken. For two axles, four measurements are taken.

Finally, the loaded weight at an axle 58 is divided by the average of the difference between the average distances a the ends of each axle measured by the indicator 10 between plates 44 and the rail for the loaded and unloaded trailer to find a calibration value for that axle 58. The calibration value is measured in pounds per inch.

To find an unknown weight carried at an axle 58, tractor-trailer 64 is parked on a flat surface, distance indicator 10 is placed on the support plate 44 mounted on each end of each axle 58 and measurements are taken from each end of the axle 58 using distance indicator 10. The average of these measurements is found. This average is subtracted from the average distance for the unloaded trailer and then multiplied by the calibration value of an axle 58 to find the load carried by the axle. The process is repeated for each axle 58.

For example, a two-axle spring ride tractor-trailer has an unloaded weight at each axle 58 of 11,000 pounds. For calibration, of the trailer is loaded with cargo so that the weight of the cargo carried by the first axle 58 is 20,000 pounds and the weight of the cargo carried by the second axle 58 is 26,000 pounds. Distance indicator 10 is used to take measurements of the distances between support plates 44 mounted on each side of each axle 58 and the frame rail 68 for the loaded trailer. The average of these measurements subtracted from the average of the distances between the plates and the frame when the trailer is unloaded is 0.335 inches. The added weight for each axle is divided by the average of the measurement differences, 0.335 inches to give calibration values of 59,701 pounds per inch for the first axle 58 and 77,611 pounds per inch for the second axle 58.

When an unknown weight is loaded onto the tractor-trailer, the total weight carried at each axle 58 is found by taking measurements with distance indicator 10 at each end of each axle. If the measurements found are: 0.550 inches and 0.420 inches for one axle and 0.430 inches and 0.690 inches for the other axle. The average of the measurements is calculated as 0.523 inches. This measurement is multiplied by the calibration value for each axle to calculate a load weight of 31,223 pounds at the first axle 58 and 40,590 pounds at the second axle 58. The load weight is added to the trailer weight of 11,000 pounds for each axle to find a total axle weight of 25,050 pounds carried by first axle 58 and a total axle weight of 34,418 pounds carried by second axle 58.

The invention may also be used for single axle tractor-trailers, single axle cargo trucks and other vehicles. To find the loaded net weight carried at a single axle 58, a calibration value for the single axle tractor-trailer is found as described.

To find an the loaded net weight of a load carried at single axle 58, tractor-trailer 64 is parked on a flat surface, distance indicator 10 is placed on the support plate 44 mounted on each end of single axle 58 and measurements are taken from each end of single axle 58 using distance indicator 10. The average of these measurements is found. This average is then multiplied by the calibration value for the axle to find the load weight carried by single axle 58. The load weight is then added to the unloaded weight at single axle 58 to find the total weight at single axle 58.

The invention may also be used for tractor-trailers having more than two axles 58. Calibration values are found for each axle 58.

The invention is particularly useful in determining total axle weight for spring ride tractor-trailers. These trailers are supported using cantilever springs having linear deflection rates. The linear deflection rates permit calculating the weight of a load carried by an axle by determining the distance between the trailer frame and the axle, as described.

The invention may also be used to determine a total axle weight for trailers using air springs where the non-linear deflection rate of the air spring is known. The deflection rate for air spring supported trailers may be determined for a given trailer by placing a number of different load weights in the trailer, measuring the distance between the axle and the trailer, as described, and plotting a load/deflection curve for the trailer. Then, the load weight for a particular loaded trailer may be determined as described above, using the load/deflection curve for the particular trailer along with distance measurements taken between a plate mounted to the axle and the trailer frame.

While I have illustrated and described preferred embodiments of my invention, it is understood that these are capable of modification, and I therefore do not wish to be limited to the precise details set forth, but desire to avail myself of such changes and alterations as fall within the purview of the following claims.

I claim:

1. A device for determining the weight at each axle of a spring ride tractor-trailer, the tractor-trailer including a cargo compartment mounted on a frame rail, the frame rail mounted on a suspension system having a spring rate, the suspension system attached to one or more axles and including one or more springs, each axle having opposed axle ends, and a wheel mounted at each axle end the device, comprising:

two support members for each axle, each support member including a first elongate arm having opposed arm ends, an axle clamp member attached on one arm end and a support plate on the other end of the arm; the axle clamp member of each support member fixed to a one end of an axle proximate one wheel so that the support plate is proximate and under a frame rail;

a distance indicator, the distance indicator comprising a body having a base, a probe extending upwardly from the body and a display gauge, the display gauge indicating the position of the probe above the body, the distance indicator positionable on the support plate of each support member so that the probe engages the frame rail to determine the distance between each plate and the rail; wherein the total weight at each axle is determined using the measured distances and the spring rate for the suspension system.

2. The device of claim 1 wherein support members are mounted on each end of a single tractor-trailer axle.

3. The device of claim 1 wherein support members are mounted on each end of a multiple axle tractor-trailer.

4. The device of claim 1 wherein the distance indicator base comprises a flange and the support plate comprises a notch, the flange engaging the notch.

5. The device of claim 4 wherein the mounting member is slidably mounted to the support member.

6. The device of claim 5 wherein the support member is rotationally attached to the mounting member.

7. The device of claim 1 wherein the spring rate is linear.

8. The device of claim 1 wherein the spring rate is nonlinear.

9. A system for determining the weight at each axle of a vehicle, the system comprising:

a vehicle having a cargo compartment;

a frame rail supporting the cargo compartment;

a suspension system supporting the frame rail;

one or more axles supporting the suspension system, each axle having opposed axle ends and a wheel at each axle end;

one or more of support members, each support member comprising an arm, the arm having opposed ends, one end of the arm attached to an axle end proximate a wheel, a mounting member attached on the other end of the arm; the mounting member comprising a mounting arm and a support plate attached to the mounting arm, the support plate located under and generally parallel to the frame rail;

a single distance indicator adapted to be mounted on each support plate to measure the distance between the support plate and the frame rail, the distance indicator comprising a body having a base, a probe extending upwardly from the body and a display gauge; the display gauge indicating the position of the probe above the body, the probe adapted to engage the frame rail and indicate the distance between the support plate and the rail, wherein the suspension system is compressed by a load placed in the cargo compartment, the frame rail moves downward and the distance indicator determines the distance the frame rail moves the probe downward at the end of each rail.

10. The system of claim 9 wherein the suspension system comprises one or more leaf springs and has a linear spring rate.

11. The system of claim 9 wherein each arm is attached to an axle by a clamp member.

12. The system of claim 9 wherein the mounting member is pivotally attached to the arm.

13. The system of claim 9 wherein the mounting member is slidably attached to the support member.

14. The system of claim 9 wherein the distance indicator base comprises a flange and the support plate comprises a notch, the flange engaging the notch.

15. The method of determining the weight at each axle of a tractor-trailer comprising a cargo compartment supported by a frame rail, the frame rail supported by a suspension system, the suspension system supported by one or more axles with a wheel located at the end of each axle and a support surface at the end of each axle located under the frame rail, comprising the steps of:
   (a) positioning a tractor-trailer on a generally flat surface;
   (b) positioning a distance indicator on each support surface, measuring the distance between such support surface and the frame rail above the support surface and then removing the distance indicator from each support surface;
   (c) averaging the distance measurements for each axle;
   (d) multiplying the average distance measurement by a conversion factor to determine the load weight on the axle; and
   (e) determining the total axle weight of the trailer by adding the weight of the trailer to the load weight of the trailer.

16. The method of claim 15 wherein the suspension system has a linear spring rate including the step of:
   (f) multiplying the average distance measurement by a constant conversion factor.

17. The method of claim 15 wherein the suspension system has a nonlinear spring rate including the step of:
   (f) multiplying the average distance measurement by a variable conversion factor.

18. The method of claim 15 includes the step of:
   (f) calculating a conversion factor for an axle by placing a weight into the cargo compartment, measuring the distance that the weight pushes the frame rail toward each axle between each end of each axle and the frame rail with a distance indicator, determining an average distance each end of each axle is pushed downward and dividing a loaded gross weight of the axle by the average distance.

* * * * *